(12) United States Patent
Rieger et al.

(10) Patent No.: US 8,292,373 B2
(45) Date of Patent: Oct. 23, 2012

(54) SPINDLE NUT

(75) Inventors: Brian Rieger, Clark, WA (US); Terry Lofthus, Washington, OR (US); Mark R. Brasch, Multnomah, OR (US)

(73) Assignee: Consolidted Metco, Inc., Vancouver, WA (US)

( * ) Notice: Subject to any disclaimer, the term of this patent is extended or adjusted under 35 U.S.C. 154(b) by 302 days.

(21) Appl. No.: 12/802,051

(22) Filed: Jun. 1, 2010

(65) Prior Publication Data

US 2011/0291468 A1    Dec. 1, 2011

(51) Int. Cl.
*B60B 27/02* (2006.01)
*F16B 39/10* (2006.01)

(52) U.S. Cl. .................. 301/111.03; 411/120; 301/105.1

(58) Field of Classification Search ............... 301/105.1, 301/111.03, 124.1, 126, 131; 384/544; 29/894.361; 411/119, 120
See application file for complete search history.

(56) References Cited

U.S. PATENT DOCUMENTS

| | | | | |
|---|---|---|---|---|
| 950,071 A * | 2/1910 | Luckey | .................. | 411/199 |
| 1,455,700 A * | 5/1923 | Adams | .................. | 411/316 |
| 2,076,218 A * | 4/1937 | Alden | .................. | 384/485 |
| 3,942,570 A * | 3/1976 | Bochman et al. | ............. | 411/220 |
| 5,395,192 A * | 3/1995 | Bennett | ......................... | 411/120 |
| 5,533,794 A * | 7/1996 | Faison | ....................... | 301/105.1 |
| 5,674,034 A * | 10/1997 | Bennett | ......................... | 411/197 |
| 6,290,442 B1 * | 9/2001 | Peterkort | ...................... | 411/140 |
| 7,029,218 B2 * | 4/2006 | Peterkort | ...................... | 411/198 |
| 8,016,531 B2 * | 9/2011 | White et al. | .................. | 411/216 |
| 2007/0052283 A1 * | 3/2007 | White | ........................ | 301/105.1 |
| 2007/0215032 A1 * | 9/2007 | Melberg et al. | .............. | 116/218 |

FOREIGN PATENT DOCUMENTS

SE    57199 C1 *    7/1924

OTHER PUBLICATIONS

STEMCO, PRP-TORQ Advanced Axle Spindle Nuts, Mar. 2005, Part No. 571-2970, Printed in the USA.

* cited by examiner

*Primary Examiner* — Kip T Kotter
(74) *Attorney, Agent, or Firm* — Edward J. Brosius

(57) ABSTRACT

A novel spindle nut assembly is presented comprising the following three components: a washer, a locking snap ring, and a nut. Each of these three components function together, and in conjunction with the spindle of a vehicle axle, to affix a wheel hub assembly onto the spindle of an axle. The three components comprising the spindle nut assembly incorporate design features allowing the components to interlock and resist loss of preload compression on the hub assembly.

13 Claims, 5 Drawing Sheets

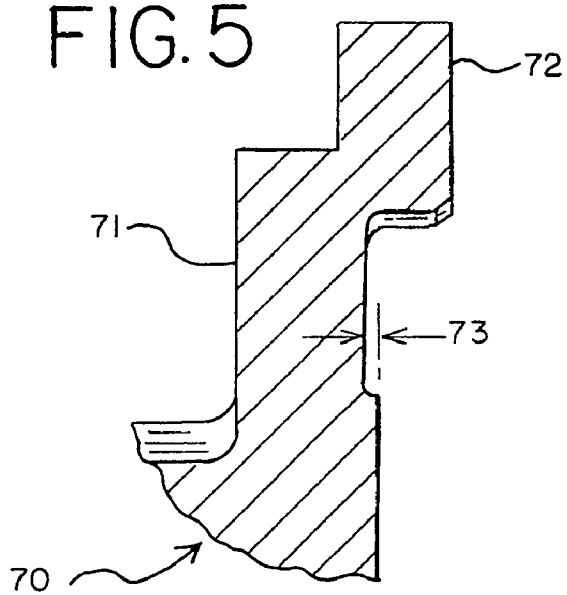
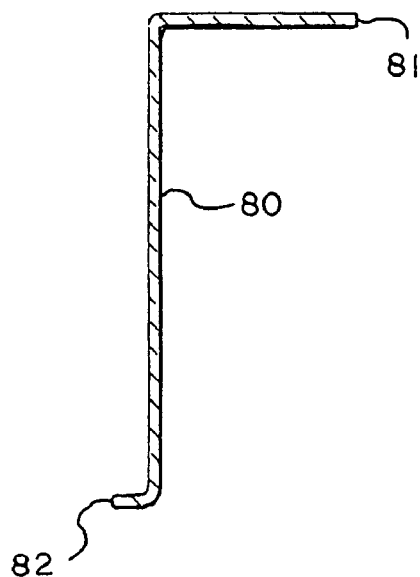
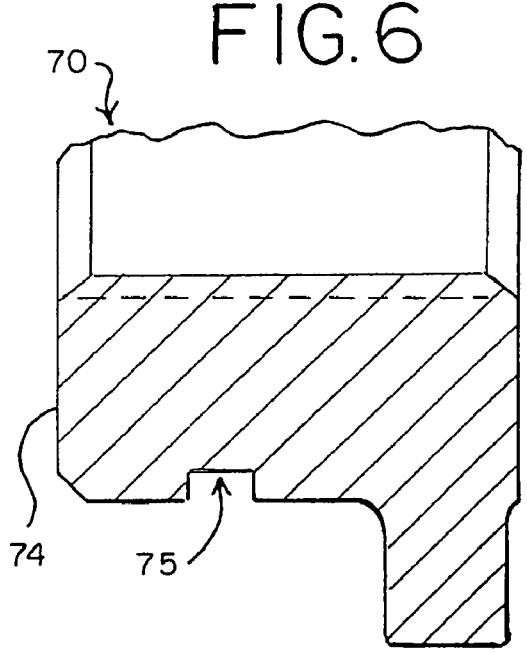

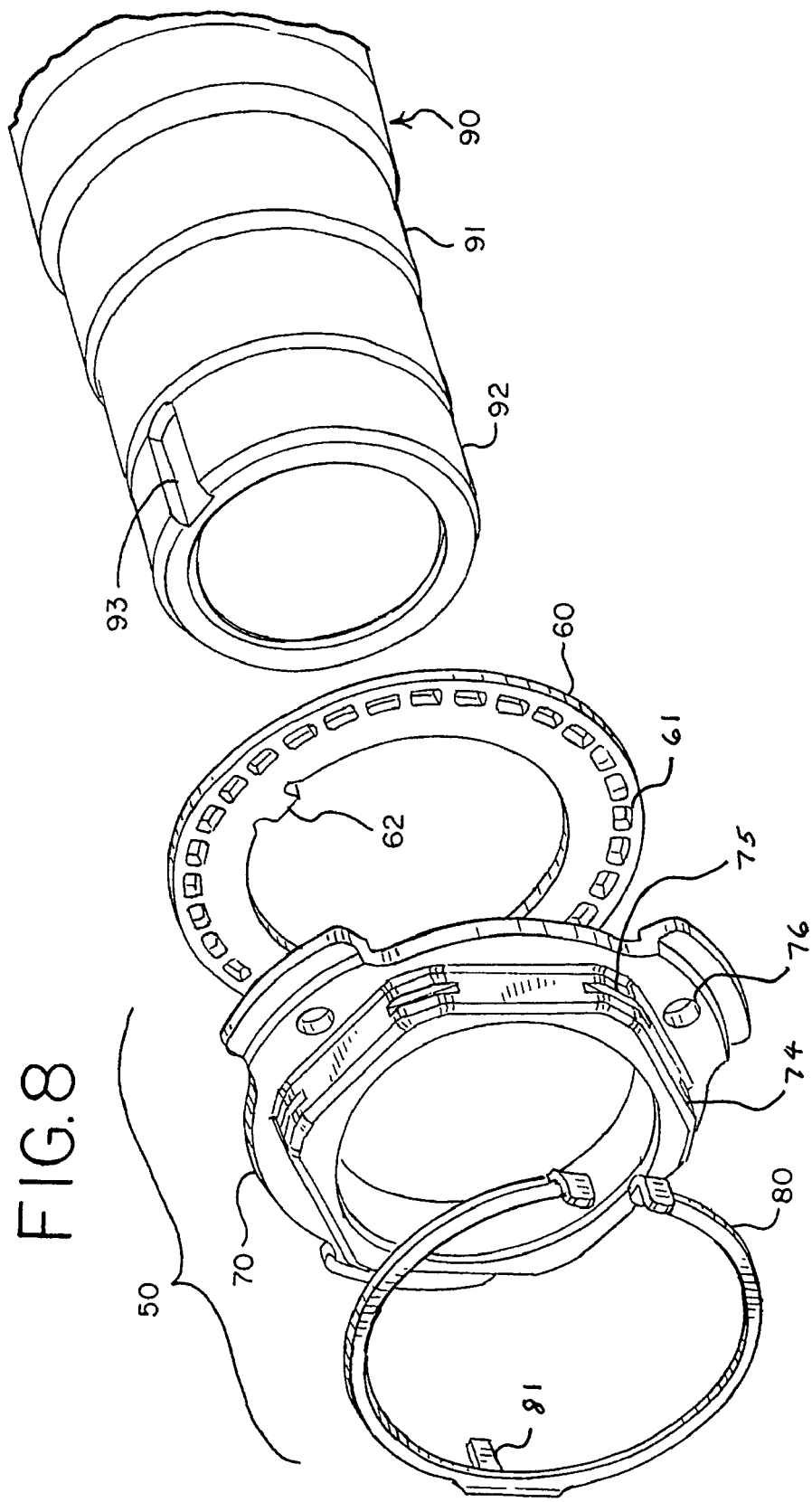

SPINDLE NUT

FIELD OF THE INVENTION

This invention relates to wheel hub assemblies and more particularly, to the spindle nut assemblies used to retain the wheel hub assembly on the spindle of a vehicle axle.

BACKGROUND OF THE INVENTION

Wheel hub assemblies mounted on the spindle of a vehicle axle provide a rotatable mounting surface on which to mount a wheel. Wheel hub assemblies are provided in many different designs dependent upon the specific application for which the hub assembly is intended. Regardless of the hub assembly design, hub assemblies generally have the following components: wheel studs, driven axle studs, seals, inboard and outboard tapered roller bearings, and a hub to house these components. Depending upon the specifics of the design, these assemblies can also include an anti lock brake ring and spacer that is placed between the inboard and outboard tapered roller bearings. A spindle nut is threaded onto the spindle to affix the hub assembly onto the spindle. The spindle nut performs the critical function of retaining the hub assembly on the spindle.

SUMMARY OF THE INVENTION

A novel spindle nut assembly is presented comprising three components: a locking washer, a locking snap ring, and a nut. Each of these three components functions together to affix the wheel hub assembly onto the spindle of an axle. The three components comprising the spindle nut assembly incorporate design features that interlock the components to retain the wheel hub assembly on the spindle.

When assembled on the spindle, the locking washer abuts the cone of the outboard bearing and engages with the spindle to prevent relative rotational motion between the locking washer and spindle. The nut is threaded onto the spindle to abut the locking washer.

A locking snap ring is seated in a groove in the nut. The locking snap ring has a tab projecting from the circumference of the locking snap ring which extends through an aperture in the nut and engages into an opening in the locking washer. With the tab of the locking snap ring extending through the nut and anchored to the locking washer, the nut is restrained against rotation.

BRIEF DESCRIPTION OF THE FIGURES

Various embodiments of the spindle nut assembly are described and illustrated in the accompanying figures. The figures are provided as examples only and are not intended to be considered as limitations to the invention. Consequently, the spindle nut assembly is illustrated by way of example and not by limitation in the accompanying figures in which:

FIG. 5 is a detailed first side view of the exemplary nut illustrated in FIG. 2 illustrating the seating surface for the locking washer of FIG. 3;

FIG. 6 is a detailed second side view of the exemplary nut illustrated in FIG. 2 illustrating the groove for the locking snap ring;

FIG. 7 is a detailed side view of the exemplary locking snap ring illustrated in the spindle nut assembly of FIG. 2;

FIG. 8 is an exploded assembly drawing of the exemplary spindle nut assembly of FIG. 2 in conjunction with a spindle;

DETAILED DESCRIPTION

Figure 1:
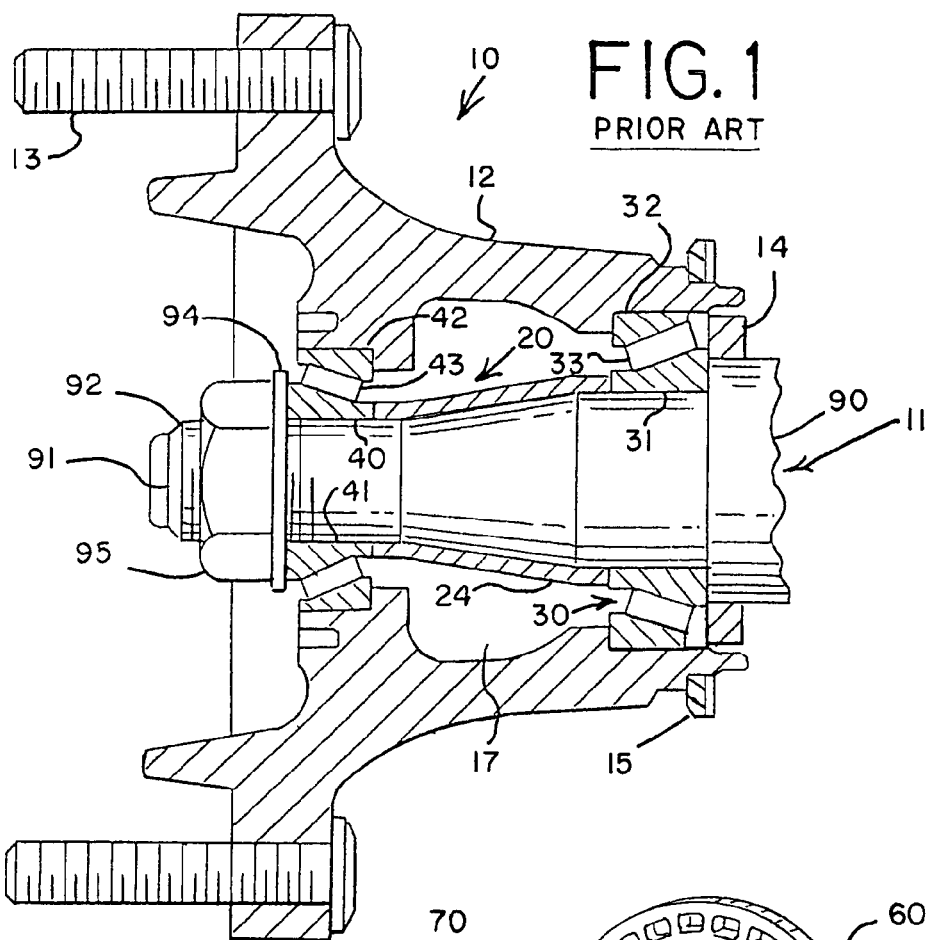
FIG. 1 is a partial sectional view of a prior art hub and axle assembly.

Referring to FIG. 1, a prior art wheel hub assembly 10 is illustrated. The hub 12 has a bore 11 extending from an inboard opening to an outboard opening. A bearing assembly 20 is housed within the bore 11, rotatably mounted on the free end of an axle 90 commonly known as a spindle 91. The hub 12 together with the bearing assembly 20 forms the hub assembly 10.

The bearing assembly 20 comprises an inboard bearing 30 and an outboard bearing 40. The bearings 30, 40 are tapered roller bearings in one embodiment. The inboard bearing 30 and the outboard bearing 40 each have a respective cone 31, 41 affixed around the spindle 91; a plurality of tapered rollers 33, 43; and a cup 32, 42 housed inside the hub 12. The tapered rollers 33, 43 are captured between the cone 31, 41 and the cup 32, 42 of each of the bearings 30, 40. In some embodiments, a cage (not shown) may also be present to maintain a desired spacing between the rollers 33, 43.

In one embodiment, the bearing assembly 20 may also include a spacer 24 to maintain the spacing between the inboard bearing 30 and the outboard bearing 40. In this embodiment, the spacer 24 is interposed and abuts the inboard cone 31 of the inboard bearing 30 and the outboard cone 41 of the outboard bearing 40 (i.e., the outboard side referring to the side closest to the free end of the axle 90). Other bearing assembly embodiments may not require a spacer to separate the inboard and outboard bearings.

The inboard bearing 30 and outboard bearing 40 are typically lubricated with oil or grease. The hub cavity 17 bounded by the hub 12, the inboard bearing 30, and outboard bearing 40 may store excess lubricant. To contain the lubricant within the hub 12, both the inboard opening and the outboard opening of the hub 12 must be sealed. Two different types of seals are used at each end of the hub 12.

On the inboard end of the hub 12, the annular space between the hub 12 and the spindle 91 is sealed with a lubricant seal 14. The lubricant seal 14 may be, for example, a metal reinforced, elastomeric material with sufficient resiliency to seal the inner circumferential interface of the hub 12 and the outer circumference of the spindle 91.

On the outboard end of the hub 12, in one embodiment, the hub is sealed against lubricant leakage with a hubcap (not shown). The hubcap covers the spindle nut 95 and the outboard bearing 40 to contain the lubricant at the outboard end of the hub 12. The hubcap may be affixed to the hub 12 with fasteners (e.g., bolts) to ensure sufficient structural integrity to avoid accidental loss of the hubcap and subsequent loss of lubricant.

With the lubricant seal 14 on the inboard end of the hub 12 and the hubcap on the outboard end of the hub, the hub cavity 17 may be filled with lubricant. In some embodiments, a fill port extends through the hub 12 into the hub cavity 17 to allow the introduction of oil or grease. The fill level of the hub cavity 17, in some embodiments, may be monitored through a viewing port in the hubcap.

The hub 12, in addition to housing the bearing assembly 20, also includes a number of design features, which dependent upon the requirements of the specific application, may also be part of the hub assembly 10. For example, in one embodiment, as shown in FIG. 1, the hub 12 includes a plurality of studs 13 onto which a wheel assembly may be mounted.

The hub 12 may also include an antilock braking system (ABS) tone ring 15 circumferentially affixed around the exterior of the inboard side of the hub 12. The ABS tone ring 15 has discrete sections around the circumference of the tone ring which induce pulses in a magnetic sensor closely coupled to the tone ring. These electrical pulses allow the ABS to determine the speed of the hub 12 and the appropriate braking power to be applied.

As noted above, the free end of the axle 90 extends to form a spindle 91 onto which the inboard bearing 30 and the outboard bearing 40 are mounted. The spindle 91, at its free end, has an external thread to accept a spindle nut 95 as depicted by the prior art illustration of FIG. 1. In this prior art exemplary illustration, the spindle nut 95 and an annular member 94 are employed to retain the hub assembly 10 on the spindle 91.

The prior art spindle nuts typically were selected from a variety of specialty spindle nuts including castellated nuts with cotter pins and lock nuts with polymeric, anti-vibration inserts. These specialty, prior art spindle nuts were used in an effort to maintain preload compression on the bearing assembly. These designs met with varying degrees of success.

As can be seen from FIG. 1, the spindle nut is essential for the safe operation of the vehicle. Degradation of the spindle nut could result in the loss of preload compression and lead to the failure of the bearing. A novel spindle nut assembly is presented below specifically designed to resist loss of preload compression.

Figure 2:
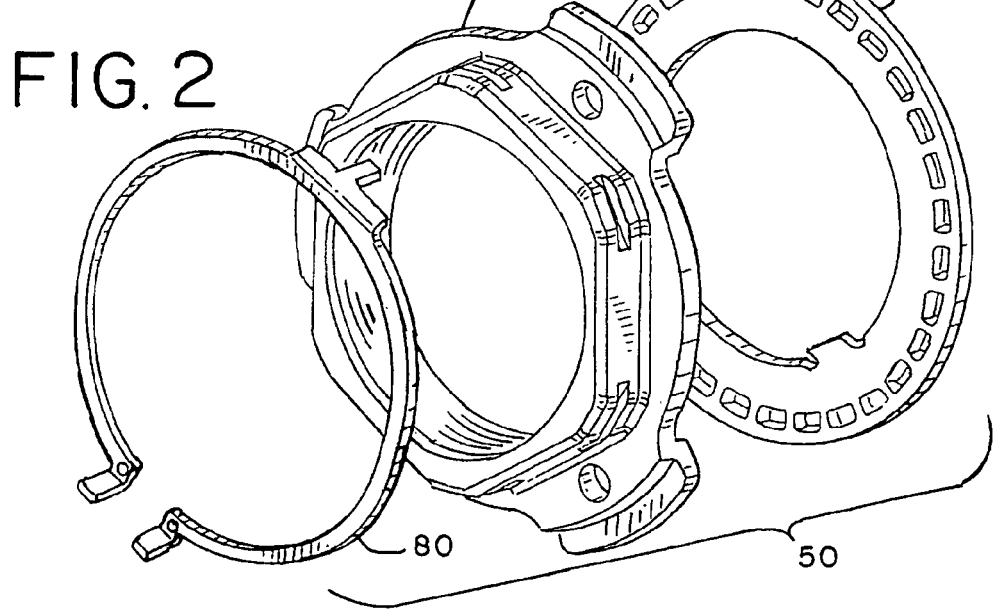
FIG. 2 is an exploded isometric view of an exemplary spindle nut assembly.

Turning to FIG. 2, an isometric view of the three components comprising the novel spindle nut assembly 50 are illustrated. In this embodiment, the spindle nut assembly 50 comprises: a washer 60, a retaining nut 70, and a locking snap ring 80. This novel spindle nut assembly 50 is designed to replace the prior art spindle nut 95 and the annular member 94 illustrated in FIG. 1.

In this embodiment, the spindle nut assembly 50 is commonly used in vehicle applications (e.g., heavy-duty trucks) to retain a wheel hub assembly on an axle. The spindle nut assembly 50 described in the following embodiments, however, may be adapted for use in many other common industrial applications. Consequently, the spindle nut assembly 50 illustrated and described below in relation to a wheel hub assembly for a vehicle is for convenience only.

Figure 3:
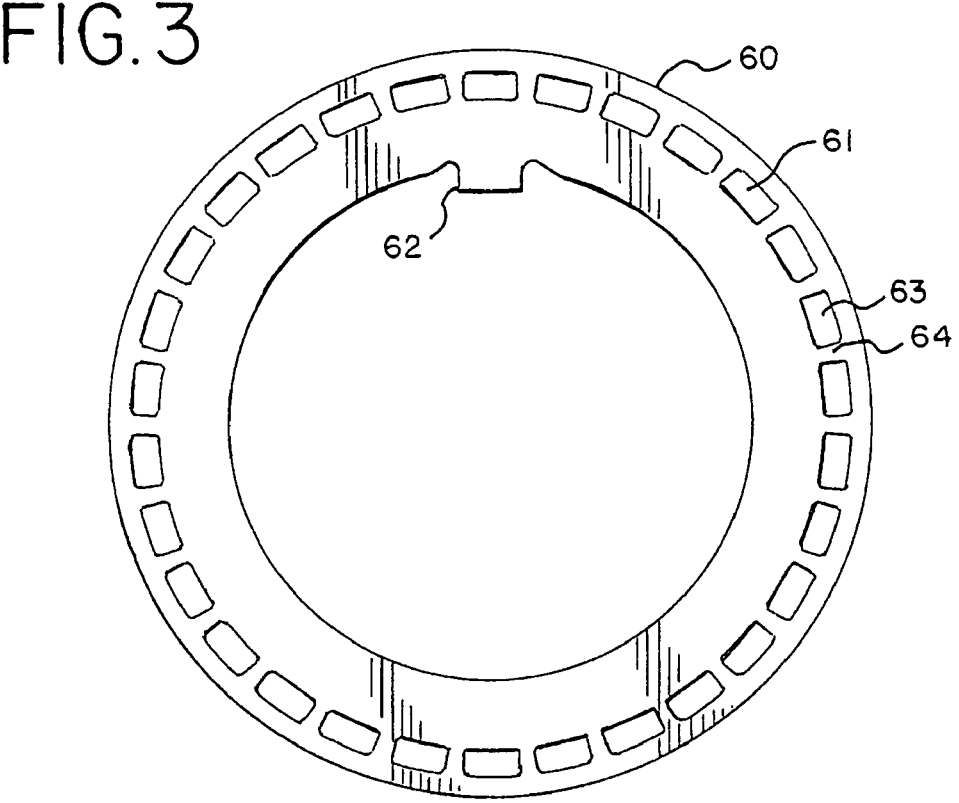
FIG. 3 is a detailed front view of the locking washer illustrated in the spindle nut assembly of FIG. 2.

Turning to FIG. 3, an exemplary front view of the washer 60 is illustrated. The washer 60, in one embodiment, has a plurality of openings 61 spaced circumferentially around and near the periphery of the washer. In this embodiment, a connecting member 64 separates each of the adjacent openings 61. In one embodiment, as illustrated in FIG. 3, the openings 61 extend to form a passage 63 through the washer 60. In another embodiment, the openings 61 may only extend sufficiently to form a cavity within the washer 60 (in contrast to forming a passage extending through the washer). In still another embodiment, the washer 60 may have a plurality of openings in the outer peripheral edge of the washer forming notches in the washer circumference. The openings 61 in the washer 60, although rectangular in the figures, may be circular or any other desired shape.

In addition to the openings described above, the washer 60 also has, in this embodiment, a tang 62 extending radially inward from the inner circumference of the washer. The tang 62 engages with the spindle to prevent relative rotational motion between the spindle and the washer 60.

Figure 4:
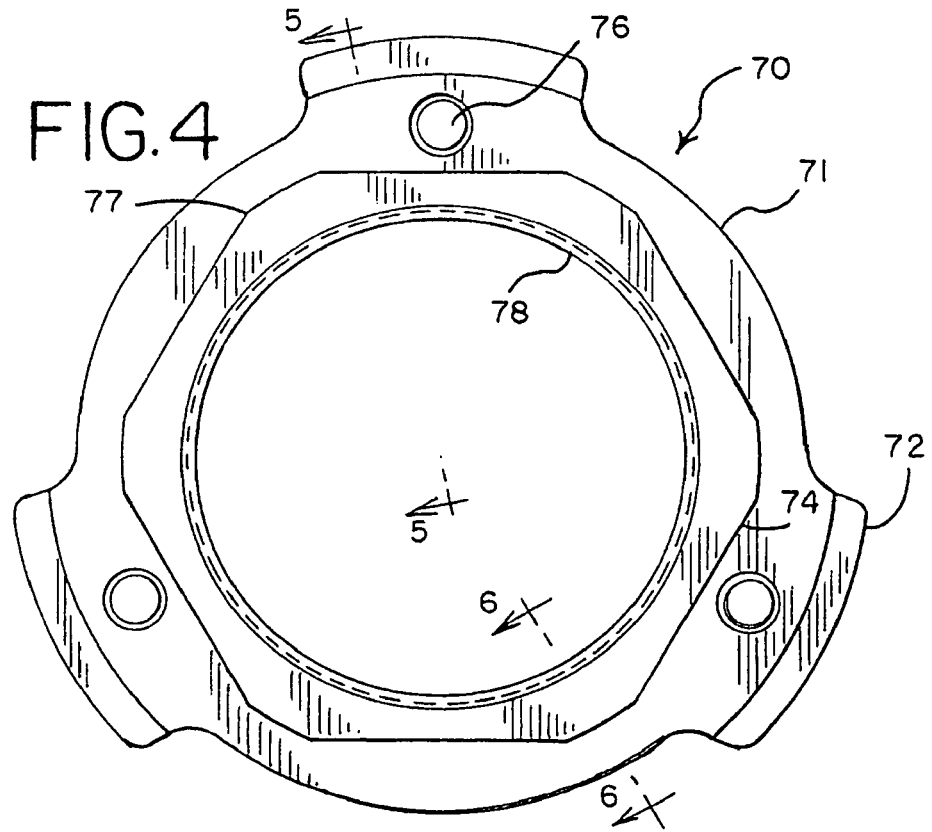
FIG. 4 is a detailed front view of the exemplary nut illustrated in the spindle nut assembly of FIG. 2.

Turning to FIG. 4, an exemplary front view of the retaining nut 70 is illustrated. In this embodiment, the retaining nut 70 has a body 74 having a multifaceted outer peripheral surface 77. This multifaceted peripheral surface 77 is designed to receive a tool to apply torque to the retaining nut. The body 74 of the retaining nut 70 has an internal thread 78 running axially along the body to engage the spindle.

In one embodiment, a flange 71 extends radially outward from the distal end of the body 74. In this embodiment, the flange 71 has at least one aperture 76 extending axially through the flange. The aperture 76 in the retaining nut 70 may take any desired geometrical shape. For example, instead of a circular aperture in the retaining nut 70 as illustrated, a curving slot through the flange of the retaining nut may be used in another embodiment.

Turning to FIG. 5, an exemplary side view of the retaining nut 70 shown in FIG. 4 is illustrated. This view depicts a pad 72 extending axially from the flange 71. The pad 72, in this embodiment, has a circular curvature on the inner periphery of the pad forming a section conforming to a portion of the outer circumference of the washer. In another embodiment, a pad 72 may extend circumferentially around the entire flange 71 to encompass the circumference of the washer. A washer seating surface 73 is provided in the retaining nut's axially inwardly directed surface.

In other embodiments, the retaining nut does not have pads. Although the pads simplify installation—assisting with the alignment of the apertures in the retaining nut and the openings in the washer—they are not required in all embodiments.

Turning to FIG. 6, another exemplary side view of the retaining nut 70 shown in FIG. 4 is illustrated. This side view illustrates the groove 75 at the intersecting faceted peripheral surfaces of the body 74 of the retaining nut 70. The retaining ring illustrated in FIG. 2 is captured in this groove.

Turning to FIG. 7, a side view of the locking snap ring 80 shown in FIG. 2 is illustrated. The locking snap ring 80 in this embodiment is a snap ring having a gripping point 82 (commonly referred to as ears) with holes allowing the engagement of retaining ring pliers. The pliers spread the locking snap ring 80 over the retaining nut and secure it in the retaining nut groove. The locking snap ring 80 also has a pin 81 projecting axially from the circumference of the locking snap ring. The pin 81, in one embodiment, extends through the retaining nut aperture and engages with an opening in the washer.

Other types of locking rings, other than snap rings, may also be used. For example, push-on retaining rings, use an alternative design that does not require a groove for seating the locking ring.

Different types of locking snap rings may also be employed. For example, the snap ring illustrated in the figures is an externally mounted snap ring (i.e., a snap ring affixed externally to a shaft). Other embodiments of the spindle nut assembly may use an internally mounted snap ring (i.e., a snap ring affixed to an internal bore) affixed to the inside of the retaining nut.

Turning to FIG. 8, an exploded assembly drawing of the spindle nut assembly 50 in conjunction with the external thread 92 of the spindle 91 to which it is to be attached is illustrated. For ease of illustration and understanding, the hub assembly surrounding the spindle 91 is not shown in this figure.

In this embodiment, a keyway 93 has been cut axially into the peripheral surface of the spindle 91, through the threaded portion and into the un-threaded portion of the spindle. The tang 62 of the washer 60, when assembled onto the spindle 91, engages the keyway 93. The tang 62 locks the washer 60 into position to prevent relative rotational motion with the spindle 91. Other types of keyways and key attachment means may also be employed. For example, a separate key may be used to connect the washer 60 to the spindle 91.

In another embodiment, the axle 90 may be milled to produce a flat section (not shown) on the peripheral surface of the spindle 91. A "D" washer (i.e., a washer with an internal D shape) (not shown) is located on the spindle 91 to allow the internal flat of the washer 60 to engage with the external flat on the spindle, rotationally affixing the washer 60 to the spindle 91.

Regardless of the mechanical configuration, the objective, in this embodiment, is to lock the washer 60 to the spindle 91 to prevent relative rotational motion. This precludes torquing forces, otherwise potentially present in the washer, from inducing counter-rotational movement in the retaining nut 70, causing loss of preload compression.

After the washer 60 is placed over the spindle 91, the retaining nut 70 is threaded onto the external thread 92 of the spindle, abutting the retaining nut against the washer. Sufficient torque is applied to obtain the desired preload compression on the inboard bearing and the outboard bearing. A calibrated torque wrench may be used to ensure the appropriate torque is applied to the retaining nut.

In one embodiment of the spindle nut assembly, if the aperture 76 in the retaining nut 70 does not align with the openings 61 in the washer 60, the retaining nut is either backed off to a lower torque setting or further torqued to achieve alignment between the aperture and the openings in the washer.

In another embodiment, the size of the aperture 76 in the retaining nut 70 and the size of the opening 61 in the washer 60 may permit the retaining ring to be adjusted, allowing the pin 81 to always connect with an opening 61 in the washer 60. That is, in some embodiments, the aperture 76 is either sufficiently large or comprises multiple openings so that perfect alignment between the aperture and an opening 61 in the washer 60 is not necessary to allow engagement of the pin 81 with the opening in the washer. Furthermore, the cross-sectional area of the pin 81 may be sufficiently small to allow adjustment of the pin's position relative to the aperture 76 in the retaining nut 70, allowing the position of the pin to be adjusted to align with an opening 61 in the washer 60. Consequently, in this embodiment, the alignment of the aperture 76 in the retaining nut 70 and the opening 61 in the washer 60 need not exactly coincide. The advantage of this embodiment is that the retaining nut 70 can be torqued according to specification without the need to over-torque or back-off the retaining nut to achieve alignment between the components of the spindle nut assembly 50.

In still other embodiments, the distal end of the pin may be modified to engage the washer. For example, the pin, in one embodiment, may at its distal end have a fork, allowing the pin to capture the connecting member between adjacent openings. Consequently, alignment of the aperture with the openings in the washer may take on a different alignment objective dependent on the design of the pin and the openings in the washer.

Figure 9:
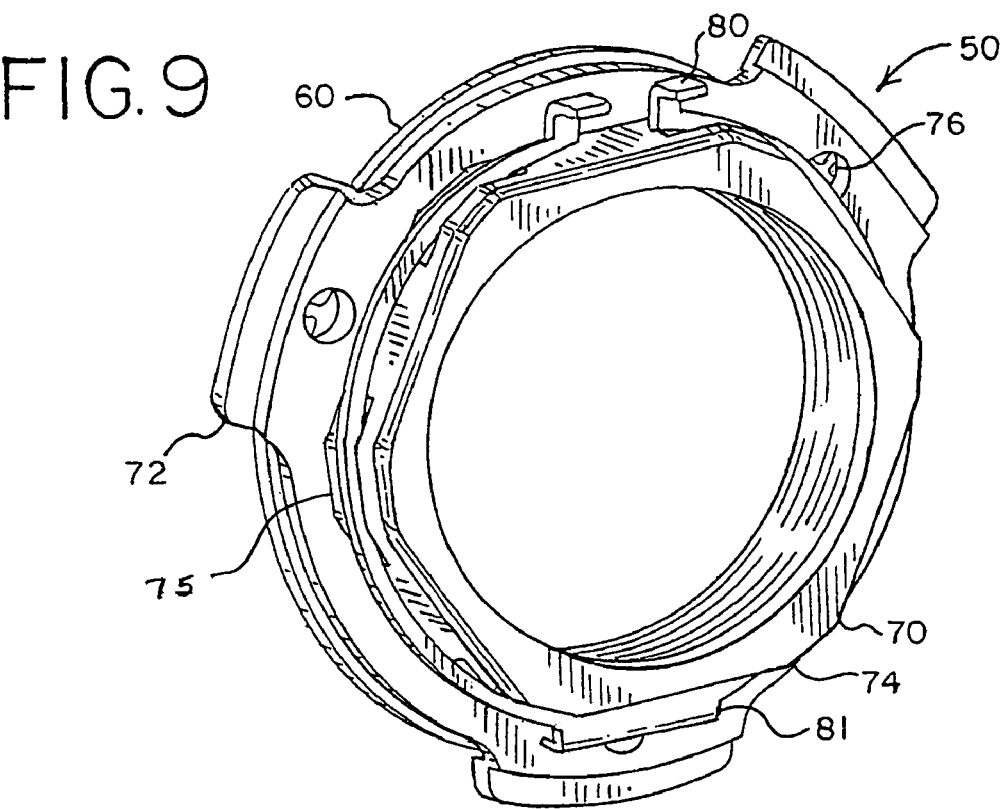
FIG. 9 is an assembled, isometric view of the exemplary, exploded spindle nut assembly of FIG. 2

Turning to FIG. 9, an isometric view of the spindle nut assembly 50 is illustrated depicting the orientation of the components as if assembled on a spindle. Once the aperture 76 in the retaining nut 70 aligns with at least one opening in the washer 60, the pin 81 may be engaged with at least one of the openings of the washer 60 through the aperture of the retaining nut. The retaining ring 80 is then seated in the groove formed in the faceted peripheral surfaces of the body 74 of the retaining nut 70.

The retaining nut 70 abuts the washer 60 to establish the required preload compression on the bearings. To maintain this preload compression, the retaining ring 80 is seated around the retaining nut 70. The pin 81 of the retaining ring 80 extends through the aperture of the retaining nut 70 and engages with the opening 61 of the washer 60. This figure illustrates the interlocking design of each of the components comprising the spindle nut assembly 50 to resist counter-rotation (i.e., loosening) of the retaining nut 70.

To prevent spindle nut counter-rotation, the spindle nut assembly employs a number of interlocking components. First, the washer 60 is rotationally affixed to the spindle 91 to isolate torsional forces otherwise potentially transmissible to the retaining nut 70. Second, the retaining ring 80 is anchored to the washer 60 with the engagement of pin 81 to at least one of the openings 61 of the washer. Because the washer 60 is locked into place relative to the spindle 91, the engagement of the pin 81 of the retaining ring 80 with the aperture of the retaining nut 70 restrains counter-rotation in the retaining nut.

While the invention has been illustrated with respect to several specific embodiments, these embodiments are illustrative rather than limiting. Various modifications and additions could be made to each of these embodiments as will be apparent to those skilled in the art.

For example, in still another embodiment, the washer may take a number of different forms. For example, the washer may take the form of a Belleville washer (not shown) having a concave surface.

In this embodiment, the Belleville washer is intentionally deformed (elastically) to provide a compressive preload on the bearing assembly during installation with the retaining nut. The Belleville washer assists in maintaining the preload on the bearing assembly because of its inherent spring capacity and capability to maintain a relatively constant force independent of deflection, allowing it to compensate for loss of preload. Maintaining the preload on the bearing assembly with the Belleville washer also inhibits further relaxation of the retaining nut 70. In this embodiment, the Belleville washer may also have the same design elements as discussed above for previously described washer embodiments.

Accordingly, the invention should not be limited by the above description or of the specific embodiments provided as examples. Rather, the invention should be defined only by the following claims.

The invention claimed is:

1. In combination with an axle having a spindle at a free end of the axle, the spindle having an external thread, a bearing assembly having an inboard bearing and an outboard bearing mounted on the spindle, the bearing assembly held in a hub, an improved spindle nut assembly comprising:

a washer having a plurality of openings, the washer abutting the outboard bearing;

a retaining nut abutting the washer, the retaining nut having an internal thread engaging the external thread of the spindle to affix the outboard bearing against axially outward displacement, the retaining nut further having an aperture; and a locking ring attached to the retaining nut, the locking ring having a pin extending through the aperture of the retaining nut, the pin engaging at least one of the plurality of openings in the washer, wherein the retaining nut includes a flange extending radially outward from the retaining nut and further wherein the aperture extends through the flange, and wherein the flange includes at least one pad extending axially inward from the flange to capture the washer.

2. The combination of claim 1, wherein the aperture is aligned with at least one of the plurality of openings in the washer.

3. The combination of claim 1, wherein the openings in the washer extend through the washer.

4. The combination of claim 1, wherein the washer is rotationally affixed to the spindle.

5. The combination of claim 1, wherein the inboard bearing and the outboard bearing each have a cone mounted to the spindle and a cup mounted to the hub.

6. The combination of claim 5, wherein a spacer is disposed between the cone of the inboard bearing and the cone of the outboard bearing.

7. The combination of claim 5, wherein the washer abuts the cone of the outboard bearing.

8. A hub assembly mounted to a spindle at the free end of an axle, the spindle having an external thread, the hub assembly comprising:
   an inboard bearing;
   an outboard bearing, the inboard bearing and the outboard bearing mounted to the spindle;
   a hub for housing the inboard bearing and the outboard bearing; and
   a spindle nut assembly comprising:
      a washer having a plurality of openings, the washer abutting the outboard bearing;
      a retaining nut abutting the washer, the retaining nut having an internal thread engaging the external thread of the spindle to affix the hub assembly against axially outward displacement, the retaining nut further having an aperture; and
      a locking ring attached to the retaining nut, the locking ring having a pin extending through the aperture of the retaining nut and engaging at least one of the plurality of openings in the washer, wherein the retaining nut includes a flange extending radially outward from the retaining nut, and further wherein the aperture extends through the flange, and the flange includes at least one pad extending axially inward from the flange to capture the washer.

9. The hub assembly of claim 8, wherein the aperture is aligned with at least one of the plurality of openings in the washer.

10. The hub assembly of claim 8, wherein the washer is rotationally affixed to the spindle.

11. The hub assembly of claim 8, wherein the inboard bearing and the outboard bearing each have a cone mounted to the spindle and a cup mounted to the hub.

12. The hub assembly of claim 11, wherein a spacer is disposed between the cone of the inboard bearing and the cone of the outboard bearing.

13. The hub assembly of claim 11, wherein the washer abuts the cone of the outboard bearing.

\* \* \* \* \*

UNITED STATES PATENT AND TRADEMARK OFFICE
CERTIFICATE OF CORRECTION

| | | |
|---|---|---|
| PATENT NO. | : 8,292,373 B2 | Page 1 of 1 |
| APPLICATION NO. | : 12/802051 | |
| DATED | : October 23, 2012 | |
| INVENTOR(S) | : Brian Rieger, Terry Lofthus and Mark R. Brasch | |

It is certified that error appears in the above-identified patent and that said Letters Patent is hereby corrected as shown below:

Title Page: Item 73 should read

Assignee: Consolidated Metco, Inc.

Signed and Sealed this
Eighteenth Day of December, 2012

David J. Kappos
*Director of the United States Patent and Trademark Office*